US012734972B2

(12) United States Patent
Muley et al.

(10) Patent No.: US 12,734,972 B2
(45) Date of Patent: Sep. 15, 2026

(54) CONSOLE BOX FOR A VEHICLE

(71) Applicant: Faurecia India Private Limited, Maharashtra (IN)

(72) Inventors: Prasanna Muley, Maharashtra (IN); Sandeep Dalavi, Maharashtra (IN)

(73) Assignee: Faurecia India Private Limited, Maharashtra (IN)

( * ) Notice: Subject to any disclaimer, the term of this patent is extended or adjusted under 35 U.S.C. 154(b) by 401 days.

(21) Appl. No.: 18/451,056

(22) Filed: Aug. 16, 2023

(65) Prior Publication Data

US 2024/0059226 A1 Feb. 22, 2024

(30) Foreign Application Priority Data

Aug. 16, 2022 (IN) ............................ 202221046502

(51) Int. Cl.
*B60R 7/04* (2006.01)
*B60N 2/75* (2018.01)
*B60R 11/00* (2006.01)

(52) U.S. Cl.
CPC ................ *B60R 7/04* (2013.01); *B60N 2/793* (2018.02); *B60R 2011/0007* (2013.01)

(58) Field of Classification Search
CPC ............... B60R 7/04; B60R 2011/0007; B60R 2011/0014; B60N 2/793; E05B 77/02; E05B 83/28; E05B 83/32
USPC ........................ 296/24.34, 37.8; 49/371, 373
See application file for complete search history.

(56) References Cited

U.S. PATENT DOCUMENTS 6,003,716 A * 12/1999 Allison ..................... B60R 7/04 220/326
8,100,453 B2 * 1/2012 Shimajiri .................. B60R 7/04 296/24.3
8,123,261 B2 2/2012 Kikuchi et al.
2017/0282808 A1 * 10/2017 Thomas ................. B65D 43/22
2019/0136592 A1 * 5/2019 Muntean ................ B60N 2/793
2019/0309545 A1 10/2019 Ries

FOREIGN PATENT DOCUMENTS

CN 111252001 A * 6/2020 ............ E05B 83/30
KR 101305795 B1 5/2008

OTHER PUBLICATIONS

English translation of CN111252001A; https//translationportal.epo.org; Oct. 8, 2025 (Year: 2025).*

* cited by examiner

*Primary Examiner* — Roger L Pang
(74) *Attorney, Agent, or Firm* — Reising Ethington P.C.

(57) ABSTRACT

A console box for a vehicle. The console box includes a body, and a cover pivotally configured with the body. The cover is configured to move between an open position and a closed position. The cover includes a first engaging element, and the body includes a second engaging element. The first engaging element and the second engaging element are adapted to engage with each other when the cover is in the closed position so that a movement of the cover along a first direction is restricted to prevent the cover from moving from the closed position to an open position in an event of an impact being applied on the vehicle.

19 Claims, 4 Drawing Sheets

CONSOLE BOX FOR A VEHICLE

TECHNICAL FIELD

The present disclosure relates to a console box of a vehicle. More particularly the present disclosure relates to a cover assembly of a console box of a vehicle with protection against an undesired unlatching of a console box cover in case of an impact to the vehicle.

BACKGROUND

Background description includes information that may be useful in understanding the present invention. It is not an admission that any of the information provided herein is prior art or relevant to the presently claimed invention, or that any publication specifically, or implicitly referenced is prior art.

Conventionally, all vehicles include a console box such with a cover/armrest, for storing objects in it. It has a great utility for drivers and passengers. Most of the time the cover of the console box is pivotally configured with a body of the console box. One can easily open and close the console box as per need.

However, in an event of impact/crash preferably in rear/front impact, it is most likely that the armrest may open due to the inertia effect of the cover/armrest which is undesirable. One such undesirable example is where vehicles that are fitted with a side airbag popping out from seats, this opened armrest can cause obstacles for proper deployment of the airbag. So, it is a desirable safety requirement that the cover/armrest should not be opened during the impact being applied on the vehicle.

There is, therefore, a need for a solution or an improved vehicular console box or a cover assembly for a console box that can restrict the undesired opening of the console box in case of impact being applied on the vehicle.

OBJECTS OF THE PRESENT DISCLOSURE

Some of the objects of the present disclosure, which at least one embodiment herein satisfy are as listed hereinbelow.

It is an object of the present disclosure to restrict the undesired opening of the console box in case of rear impact on the vehicle.

It is an object of the present disclosure to provide a cost-effective solution for restricting the undesired opening of the console box, which requires minimal changes for retrofitting to the existing console box.

It is an object of the present disclosure to provide a console box for a vehicle, which provides an anti-opening mechanism of a cover of the console box in case of an impact being applied on the vehicle.

It is an object of the present disclosure to provide a console box for a vehicle, which meets mandatory safety requirements in case of an impact being applied on the vehicle.

It is an object of the present disclosure to provide a console box for vehicle, which is easy to implement and use.

SUMMARY

The present disclosure relates to a console box of a vehicle. More particularly the present disclosure relates to a console box of a vehicle with protection against an undesired opening of a console box cover in case of an impact being applied to the vehicle.

An aspect of the present disclosure pertains to a console box for a vehicle. The console assembly comprises a body having a cavity for storing objects therein. A cover may be pivotally arranged with the body. The cover may be configured to move between an open position and a closed position. The open position corresponds to a position of the cover when the cavity is not covered with the cover and the closed position corresponds to a position of the cover when the cavity is completely covered with the cover. The cover comprises a first engaging element, and the body comprises a second engaging element, where the first engaging element and the second engaging element are configured to engage with each other when the cover is in the closed position, such that a movement of the cover along a first direction is restricted to prevent the cover from moving from the close position to the open position in an event of an impact being applied to the vehicle.

In an aspect, the cover or body may comprise a hook element configured to be latched against a slit arranged/configured in the body or cover such that the cover is latched with the body.

In an aspect, the cover may be de-latched from the body when the hook element is moved away from the slit for example via a knob to move the cover pivotably between the open position and the closed position.

In an aspect, the cover is pivotably arranged on the body via a hinge element around a pivotal axis, wherein the first direction is substantially perpendicular to the pivotal axis of the hinge element.

In an aspect, the hook element may be at least partially enclosed by the first engaging element.

In an aspect, when the first engaging element is a protrusion, the second engaging element may be a slot, and when the first engaging element is a slot, the second engaging element may be a protrusion.

In an aspect, the first engaging element may be configured at a bottom surface of the cover.

In an aspect, the second engaging element may be arranged at a pre-defined position on an inner surface or an outer surface of the body.

In an aspect, the protrusion extended substantially perpendicularly/obliquely from a length-wise edge surface of the cover or body may be adapted to be engaged within the slot arranged on a length-wise edge surface of the body or cover when the cover is in the closed position. In another aspect, the protrusion extended substantially perpendicularly/obliquely from a width-wise edge surface of the cover or body may be adapted to be engaged within the slot arranged on a width-wise edge surface of the body or cover when the cover is in the closed position.

In an aspect, the console box is arranged in a front-rear direction of the vehicle wherein the hinge element can is arranged at the frontal and/or rear side of the vehicle.

In an aspect, upon the impact being applied on the vehicle preferably upon a rear/front crash, at least a portion of the first engaging element may abut with an inner wall surface of the cavity to restrict the movement of the cover in the first direction. As the movement of the cover in the first direction is restricted, the hook element does not move away from the slit or does not move completely out of the slit thus avoiding/preventing pivotal movement of the cover towards the open position.

In an aspect, the cover may comprise a cushion configured at an upper surface of the cover to be used as an armrest in the close position.

In another aspect of the present disclosure pertains to a cover assembly for a console body for a vehicle. The console assembly comprises a body having a cavity for storing objects therein. The cover assembly comprises a cover adapted to be pivotally arranged on the body to close/open the cavity of the body. Further, the cover may include a first engaging element and the body may include a second engaging element that is adapted to be engaged with the first engaging element when the cover is in a closed position, such that upon an impact being applied on the vehicle a movement of the cover along a first direction is restricted to prevent the cover from moving from the close position to an open position in an event of an impact being applied on the vehicle.

In an aspect, the cover or body may comprise a hook element configured to be latched against a slit arranged in the body or cover such that the cover is latched with the body. The cover is de-latched from the body when the hook element is moved away (slidably or pivotably) from the slit via a knob to move the cover between the open position and the closed position. More particularly, the cover is pivotably arranged on the body via a hinge element around a pivotal axis, wherein the first direction is substantially perpendicular to the pivotal axis of the hinge element.

In an aspect, the hook element may be at least partially enclosed by the first engaging element.

In an aspect, the first engaging element is a protrusion, and the second engaging element is a slot. In another aspect, the first engaging element is a slot, and the second engaging element is a protrusion.

In an aspect, the first engaging element is arranged at a bottom surface of the cover and the second engaging element is arranged at a predefined position on an inner surface or an outer surface of the body.

In an aspect, wherein the protrusion extended substantially perpendicularly/obliquely from a length-wise edge surface of the cover adapted to be engaged with the slot arranged on a length-wise edge surface of the body when the cover is in the closed position. In another aspect, the protrusion extended substantially perpendicularly/obliquely from a width-wise edge surface of the armrest adapted to be engaged within the slot arranged on a width-wise edge surface of the body when the cover is in the closed position.

In an aspect, the console box is arranged in a front-rear direction of the vehicle, where the hinge element can is arranged at the frontal and/or rear side of the vehicle.

In an aspect, upon the impact being applied on the vehicle preferably upon a rear/front crash, at least a portion of the first engaging element may abut with an inner wall surface of the cavity to restrict the movement of the cover in the first direction. As the movement of the cover in the first direction is restricted, the hook element does not move away from slit or does not move completely out of the slit thus avoiding/preventing pivotal movement of the cover towards the open position.

In an aspect, the cover may comprise a cushion configured at an upper surface of the cover to be used as an armrest in it close position Various objects, features, aspects, and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure. The diagrams are for illustration only, which thus is not a limitation of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
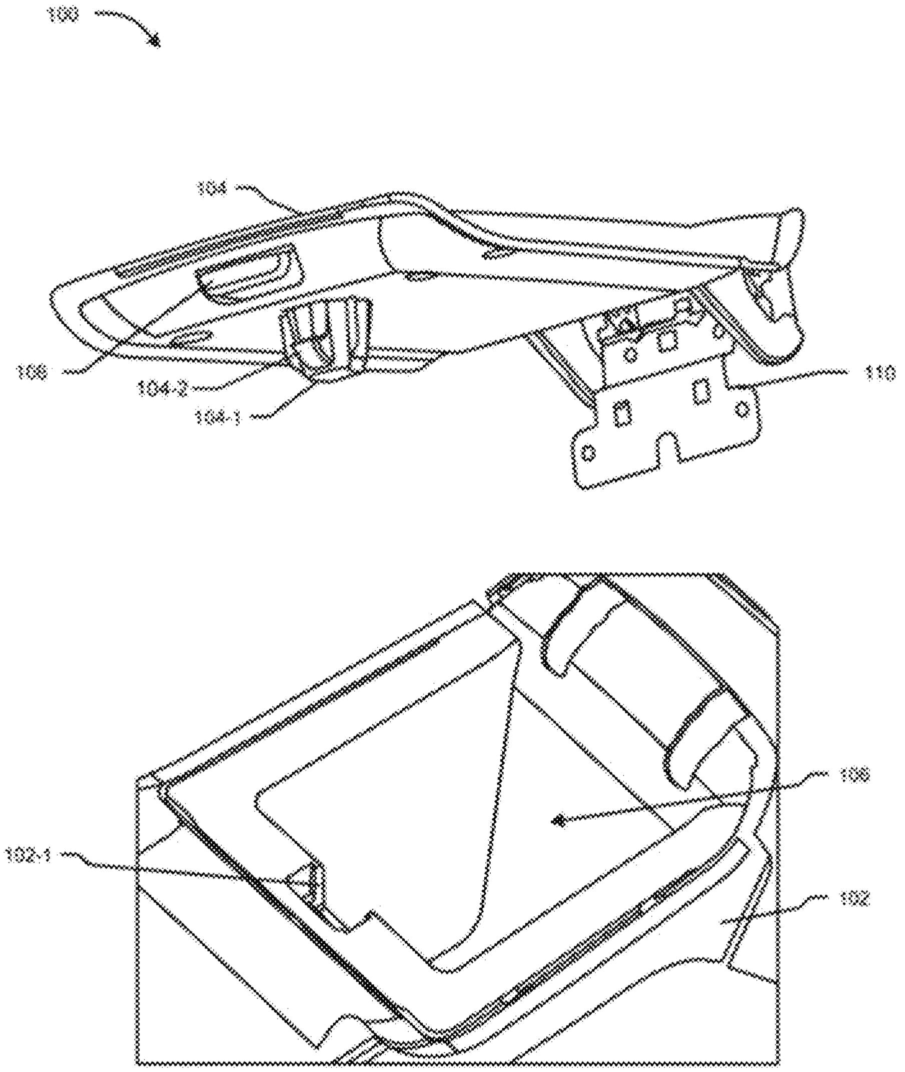
FIGS. 1-2 illustrates an exemplary representation of a console box for a vehicle, in accordance with an embodiment of the present disclosure.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present disclosure elaborate upon a console box of a vehicle. More particularly the present disclosure relates to a console box of a vehicle with protection against an undesired opening of the console box cover in case of an impact being applied to the vehicle.

A console box for a vehicle comprises a body having a cavity for storing objects therein. A cover may be pivotally arranged with the body. The cover may be configured to move between an open position and a closed position. The open position corresponds to a position of the cover when the cavity is not covered with the cover and the closed position corresponds to a position of the cover when the cavity is completely covered with the cover. The cover comprises a first engaging element, and the body comprises a second engaging element, where the first engaging element and the second engaging element are configured to engage with each other when the cover is in the closed position, such that a movement of the cover along a first direction is restricted to prevent the cover from moving from the close position to the open position in an event of an impact being applied to the vehicle.

In an embodiment, the cover or body can comprise a hook element configured to be latched against a slit configured in the body or cover such that the cover is latched with the body.

In an embodiment, the cover can be de-latched from the body when the hook element is moved away from the slit.

In an embodiment, the hook element can be at least partially enclosed by the first engaging element.

In an embodiment, when the first engaging element is a protrusion, the second engaging element can be a slot, and when the first engaging element is a slot, the second engaging element can be a protrusion.

In an embodiment, the first engaging element can be configured at a bottom surface of the cover.

In an embodiment, the second engaging element can be arranged at a pre-defined position on an inner surface or an outer surface of the body.

In an embodiment, the cover can comprise a cushion configured at an upper surface of the cover to be used as an armrest.

An embodiment of the present disclosure pertains to a cover assembly for a console body for a vehicle. The console assembly comprises a body having a cavity for storing objects therein. The cover assembly comprises a cover adapted to be pivotally arranged on the body to close/open a cavity of the body. Further, the cover includes a first engaging element and the body includes a second engaging element that is adapted to be engaged with the first engaging element when the cover is in a closed position, such that upon an impact being applied on the vehicle a movement of the cover in a first direction is restricted to prevent the cover from moving from the close position to an open position.

In an embodiment, the cover or body comprises a hook element configured to be latched against a slit arranged in the body or cover such that the cover is latched with the body. The cover is de-latched from the body when the hook element is moved away (slidably or pivotably) from the slit via a knob to move the cover between the open position and the closed position. More particularly, the cover is pivotably arranged on the body via a hinge element around a pivotal axis, wherein the first direction is substantially perpendicular to the pivotal axis of the hinge element.

In an embodiment, the first engaging element is a protrusion, and the second engaging element is a slot. In another embodiment, the first engaging element is a slot, and the second engaging element is a protrusion.

In an embodiment, the first engaging element is arranged at a bottom surface of the cover and the second engaging element is arranged at a predefined position on an inner surface or an outer surface of the body.

In an embodiment, wherein the protrusion extended substantially perpendicularly/obliquely from a length-wise edge surface of the cover adapted to be engaged with the slot arranged on a length-wise edge surface of the body when the cover is in the closed position. In another embodiment, the protrusion extended substantially perpendicularly/obliquely from a width-wise edge surface of the armrest adapted to be engaged within the slot arranged on a width-wise edge surface of the body when the cover is in the closed position.

In an embodiment, the console body is arranged in the front-rear direction of the vehicle, wherein upon the impact being applied on the vehicle preferably upon a rear/front crash, at least a portion of the first engaging element abut with an inner wall surface of the cavity to restrict the movement of the cover in the first direction.

Referring to FIGS. 1 to 5, the console box 100 (also referred to as console assembly 100, herein) for a vehicle is illustrated. The console box 100 can include a body 102 having a cavity 106 for storing object(s) therein. The body 102 of the console box 100 can be made of any of but is not limited to metal, plastic, and fibre. A cover 104 can be pivotally arranged with body 102, which can be configured to move between an open position and a closed position. The cover 104 can also be made of any of but is not limited to metal, plastic, and fibre. The cover 104 can include a cushion configured on the upper surface of the cover 104 to allow users to rest their arms thereover. The open position of the cover 104 can correspond to the position when the cavity 106 of the body 102 is not covered with the cover 104. The closed position of the cover 104 corresponds to the position of the cover 104 when the cavity 106 is (completely) covered with the cover 104.

Figure 2:
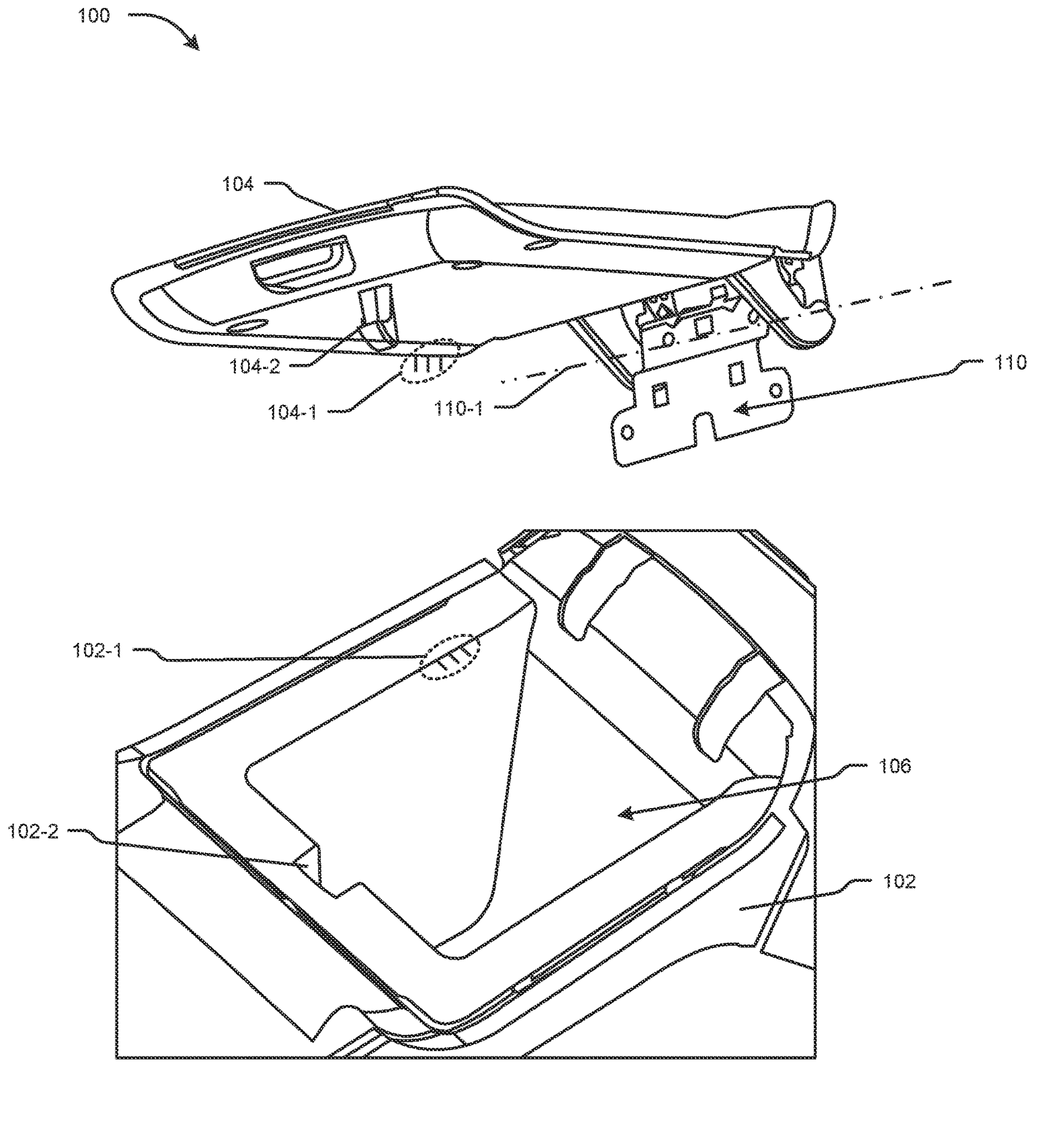
Figure 3:
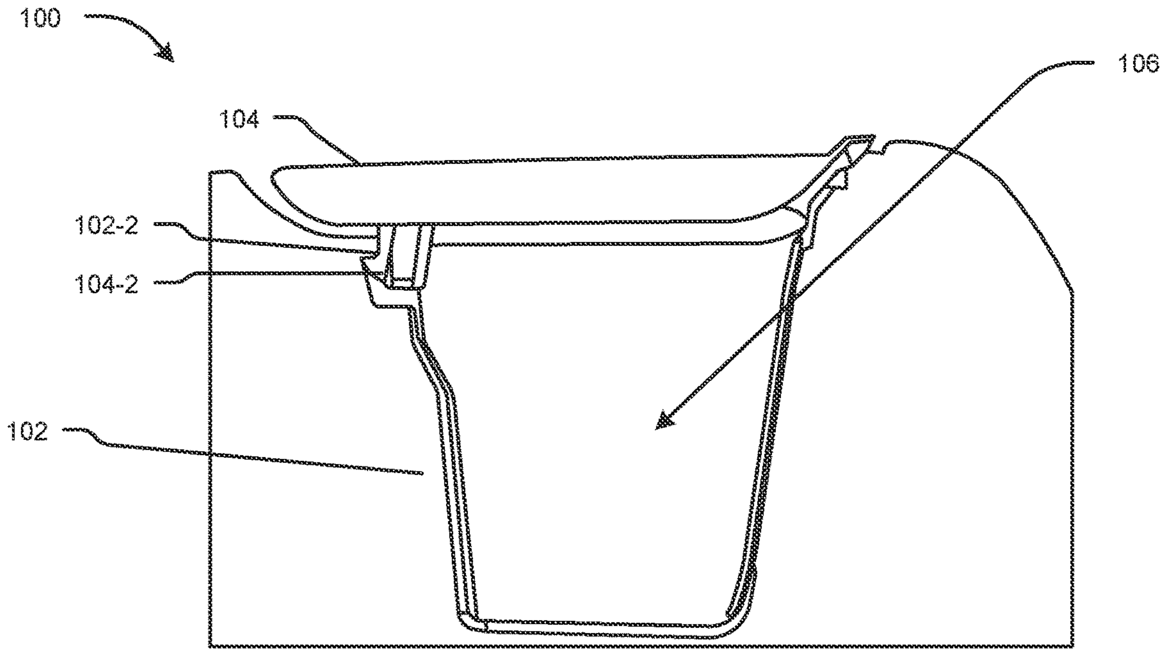
FIG. 3 illustrates an exemplary representation of a side view of the console box, in accordance with an embodiment of the present disclosure.

In an embodiment, the cover 104 can include a first engaging element 104-1 that can be configured on a lower or bottom surface of the cover 104. Further, the body 102 can include a second engaging element 102-1. The second engaging element 102-1 can be arranged at a pre-defined position on an inner surface or an outer surface of walls (as illustrated in FIG. 2) of the body 102. The first engaging element 104-1 and the second engaging element 102-1 can be configured to engage with each other when the cover 104 is in the closed position so that a movement of the cover along a first direction is restricted to avoid undesired opening of the cover 104 from the body 104 of the console box 100, in an event of an impact to the vehicle. The first engaging element 104-1 and the second engaging element 102-1 can engage with each other.

In an embodiment, the console box 100 is arranged in a front-rear direction of the vehicle wherein a hinge element 110 can is arranged at the frontal and/or rear side of the vehicle that facilitates the pivotal movement of the cover 104 along a pivotal axis 110-1 of the hinge element 110, for moving the cover 104 between the open position and the closed position. In which, the first direction is substantially perpendicular to the pivotal axis 110-1 of the hinge element 110. Upon an impact being applied on the vehicle (like in a rear/front crash/impact) can generally move the cover 104 along the first direction due to the inertia of the vehicle, then the cover 104 can move pivotally from the closed position to the open position which can lead to an undesired opening of the cover 104, however, the engagement of the first engaging element 104-1 and the second engaging element 102-1 restricts any such undesired opening of the cover 104 from the body 104 of the console box 100, in an event of the impact being applied on the vehicle.

In an embodiment, the cover 104 can include the hook element 104-2 that can be configured to be latched against a slit 102-2 configured in the body 102 such that the cover 104 remains latched with the body 102 through the hook element 104-2 and the slit 102-2, when the cover 104 is in the closed position. The hook element 104-2 can be moved or pushed away from the slit 102-2 (slidably or pivotably) in order to de-latch the cover 104 from the body 102 when needed. The first direction can correspond to a direction same or opposite to the direction of movement of the vehicle.

In an embodiment, the first engaging element 104-1 and the second engaging element 102-1 can include be selected from any of a protrusion and a slot. In an embodiment (as shown in FIG. 1), when the first engaging element 104-1 is a protrusion, the second engaging element can be a slot and a position of the slot can be corresponding to the protrusion to accommodate the protrusion when the cover 104 is in the closed position. In another embodiment (not shown), when the first engaging element 104-1 is a slot, the second engaging element can be a protrusion and a position of the protrusion can be corresponding to the slot to accommodate the protrusion when the cover 104 is in the closed position. In yet another embodiment (as shown in FIG. 2), the first engaging element 104-1 can be a rib extending in along a first axis, and the second engaging element 102-1 can also be a rib extending in along a second axis substantially orthogonal to the first axis. Further, the length of the first engaging element 104-1 and the second engaging element 102-1 (ribs) can be chosen such that the first engaging element 104-1 can get engaged with the second engaging element 102-1 when the cover 104 is in the closed position, and in case of the impact being applied on the vehicle.

Figure 4:
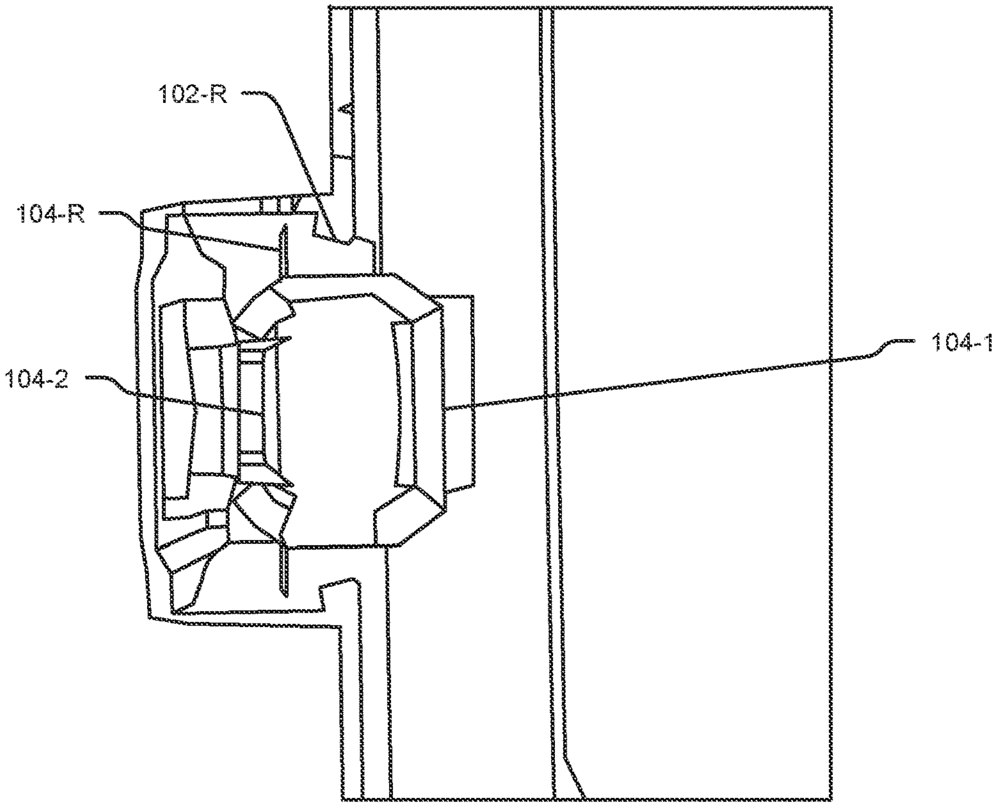
FIG. 4 illustrates an exemplary representation of a top view of the console box, wherein the cover part is hidden in such a way a hook element and first engaging element of the cover assembly is illustrated for vehicle, in accordance with an embodiment of the present disclosure.
Figure 5:
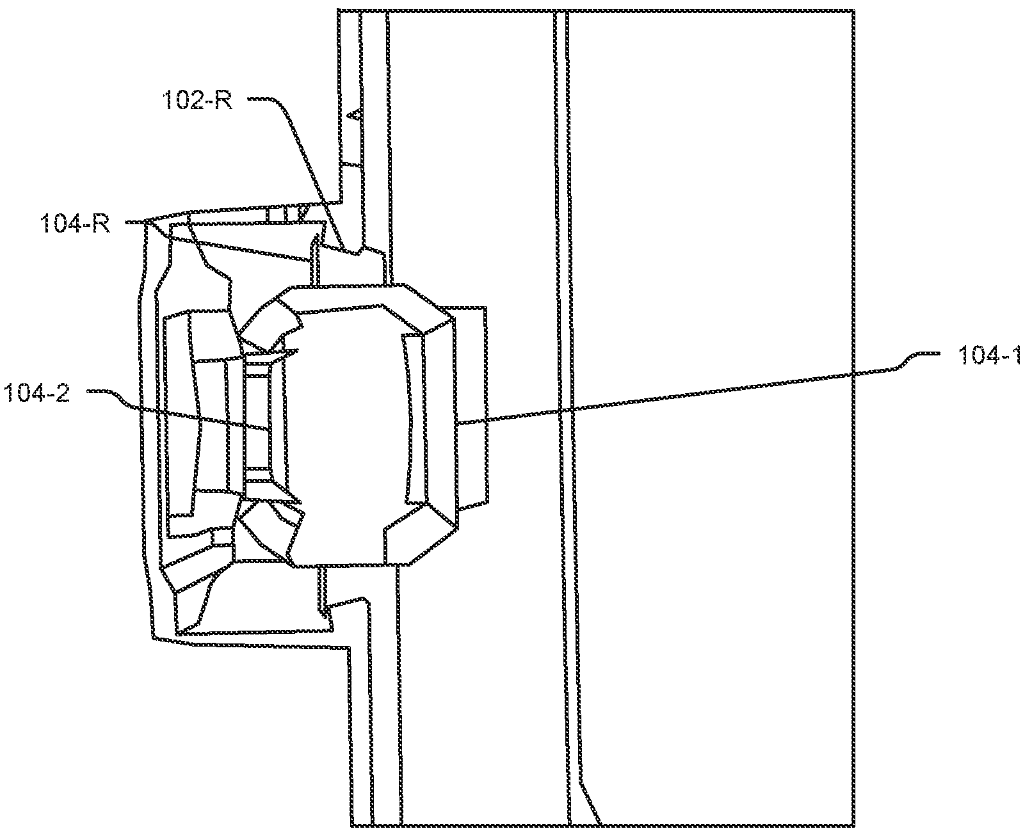
FIG. 5 illustrates an exemplary representation of the top view of the console box of FIG. 4 in case of a front/rear crash of the vehicle.

As illustrated in FIG. 4, in an embodiment, the hook element 104-2 of the cover 104 can be at least partially enclosed by the first engaging element 104-1 such that the hook element is free to move between a lock position (wherein the cover and body is locked with each other) and a unlock position (wherein the cover is de-latched from the body) via a (push or hinge) knob (108). The first engaging element 104-1 can include a portion 104-R extending along the first axis. Corresponding to the first ribs 104-R, the second engaging element 102-1 that is a slot on the body includes an inner wall surface 102-R extending along the second axis. The first axis can be substantially orthogonal to the second axis and a length of the portion 104-R and the inner wall surface 102-R of the slot, such that the portion 104-R can get engaged with the inner wall surface 102-R when the cover is in the closed position and when the impact is being applied on the vehicle (as shown in FIG. 5), thereby restricting the undesired movement of the cover 104 along the first direction.

Accordingly, the present invention restricts the undesired opening of the cover 104 from the body 102 of the console box 100 in case of the impact to the vehicle (like in a rear/front crash/impact), thereby avoiding any chances of distraction to the driver while driving the vehicle and also preventing any injuries to the passenger and the driver or damage to the vehicle interior. Besides, the present invention is also cost-effective as only minimal changes are required to retrofit the engaging elements and hook elements 110 to the existing console box.

In an embodiment, the protrusion can extend substantially perpendicularly/obliquely from a length-wise edge surface of the cover 104 that is adapted to be engaged with the slot arranged on a length-wise edge surface of the body 102 when the cover 104 is in the closed position (as shown in FIG. 2). In another embodiment, the protrusion can extend substantially perpendicularly/obliquely from a width-wise edge surface of the armrest adapted to be engaged within the slot arranged on a width-wise edge surface of the body when the cover is in the closed position (as shown in FIG. 1). Referring to FIG. 5, upon the impact being applied on the vehicle preferably upon a rear/front crash, at least a portion 104-R of the first engaging element 104-1 abut with an inner wall surface 102-R of the second engaging element 102-1 to restrict the movement of the cover 104 in the first direction such that the hook element 104 do not move away from slit or do not move completely out of the slit thus avoiding/preventing pivotal movement of the cover 104 towards the open position.

Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions, or examples, which are included to enable a person having ordinary skill in the art to make and use the invention when combined with information and knowledge available to the person having ordinary skill in the art.

Advantages of the Invention

The proposed invention restricts the undesired opening of the console box in case of a rear impact on the vehicle The proposed invention provides a cost-effective solution for restricting the undesired opening of the console box, which requires minimal changes for retrofitting to the existing console box.

The proposed invention provides a console box for a vehicle, which provides an anti-opening mechanism of a cover of the console box in case of an impact being applied on the vehicle.

The proposed invention provides a console box for a vehicle, which meets mandatory safety requirements in case of an impact being applied on the vehicle.

The proposed invention provides a console box for vehicle, which is easy to implement and use.

The invention claimed is:

1. A console box for a vehicle, the console box comprising:

a body having a cavity for storing objects therein;

a cover pivotally configured with the body, and the cover is configured to move between an open position and a closed position, the open position corresponds to a position of the cover when the cavity is not covered with the cover and the closed position corresponds to a position of the cover when the cavity is completely covered with the cover, wherein, the cover comprises a first engaging element, the body comprises a second engaging element that is adapted to engage with the first engaging element when the cover is in the closed position, such that a movement of the cover along a first direction is restricted to prevent the cover from moving from the closed position to the open position in an event of an impact to the vehicle, any of the cover or the body comprises a hook element configured to be latched against a slit arranged in any of the body or the cover, wherein the first engaging element or the second engaging element is a protrusion, and the hook element is located adjacent to the protrusion, and wherein upon the impact being applied on the vehicle upon a rear/front crash, at least a portion of the first engaging element abuts with an inner wall surface of the second engaging element thus preventing the hook element from moving away from the slit to restrict the movement of the cover in the first direction.

2. The console box as claimed in claim 1, wherein the cover is de-latched from the body when the hook element is moved away from the slit via a knob to move the cover pivotably between the open position and the closed position.

3. The console box as claimed in claim 2, wherein the cover is pivotably arranged on the body via a hinge element around a pivotal axis, wherein the first direction is substantially perpendicular to the pivotal axis of the hinge element.

4. The console box as claimed in claim 1, wherein the first engaging element is the protrusion, and the second engaging element is a slot.

5. The console box as claimed in claim 1, wherein the first engaging element is a slot, and the second engaging element is the protrusion.

6. The console box as claimed in claim 1, wherein the first engaging element is arranged at a bottom surface of the cover, and the second engaging element is arranged at a predefined position on an inner surface or an outer surface of the body.

7. The console box as claimed in claim 4, wherein the protrusion extends substantially perpendicularly/obliquely from a length-wise edge surface of the cover adapted to be engaged within the slot arranged on a length-wise edge surface of the body when the cover is in the closed position.

8. The console box as claimed in claim 5, wherein the protrusion extends substantially perpendicularly/obliquely from a width-wise edge surface of the body adapted to be engaged within the slot arranged on a width-wise edge surface of the cover when the cover is in the closed position.

9. A cover assembly for a console body of a vehicle, the cover assembly comprising:

a cover adapted to be pivotally arranged on the console body to close/open a cavity of the console body, wherein the cover includes a first engaging element and the console body includes a second engaging element that is adapted to be engaged with the first engaging element when the cover is in a closed position, such that a movement of the cover along a first direction is restricted to prevent the cover from moving from the closed position to an open position in an event of an impact being applied on the vehicle, any of the cover or the console body comprises a hook element configured to be latched against a slit arranged in any of the console body or the cover, wherein the first engaging element or the second engaging element is a protrusion, and the hook element is located adjacent to the protrusion, and wherein upon the impact being applied on the vehicle upon a rear/front crash, at least a portion of the first engaging element abuts with an inner wall surface of the second engaging element thus preventing the hook element from moving away from the slit to restrict the movement of the cover in the first direction.

10. The cover assembly as claimed in claim 9, wherein the cover is de-latched from the console body when the hook element is moved away from the slit via a knob to move the cover pivotably between the open position and the closed position.

11. The cover assembly as claimed in claim 9, wherein the cover is pivotably arranged on the console body via a hinge element around a pivotal axis, wherein the first direction is substantially perpendicular to the pivotal axis of the hinge element.

12. The cover assembly as claimed in claim 11, wherein the cover assembly is arranged in a front-rear direction of the vehicle and the hinge element is disposed at least one of a frontal or a rearward side of the vehicle such that the protrusion is located in the frontal direction of the vehicle adjacent to the hook element.

13. The cover assembly as claimed in claim 9, wherein the first engaging element is the protrusion, and the second engaging element is a slot.

14. The cover assembly as claimed in claim 9, wherein the first engaging element is a slot, and the second engaging element is the protrusion.

15. The cover assembly as claimed in claim 9, wherein the first engaging element is arranged at a bottom surface of the cover, and the second engaging element is arranged at a predefined position on an inner surface or an outer surface of the console body.

16. The cover assembly as claimed in claim 13, wherein the protrusion extends substantially perpendicularly/obliquely from a length-wise edge surface of the cover adapted to be engaged within the slot arranged on a length-wise edge surface of the console body when the cover is in the closed position.

17. The cover assembly as claimed in claim 14, wherein the protrusion extends substantially perpendicularly/obliquely from a width-wise edge surface of the console body adapted to be engaged within the slot arranged on a width-wise edge surface of the cover when the cover is in the closed position.

18. A console box for a vehicle, the console box comprising:

a body having a cavity for storing objects therein;

a cover pivotally configured with the body, and the cover is configured to move between an open position and a closed position, the open position corresponds to a position of the cover when the cavity is not covered with the cover and the closed position corresponds to a position of the cover when the cavity is completely covered with the cover, wherein, the cover comprises a first engaging element, the body comprises a second engaging element that is adapted to engage with the first engaging element when the cover is in the closed position, such that a movement of the cover along a first direction is restricted to prevent the cover from moving from the closed position to the open position in an event of an impact to the vehicle, any of the cover or the body comprises a hook element configured to be latched against a slit arranged in any of the body or the cover, wherein the first engaging element or the second engaging element is a protrusion, located in the frontal direction of the vehicle adjacent to the hook element, such that the cover is latched with the body, wherein the cover is de-latched from the body when the hook element is moved away from the slit via a knob to move the cover pivotably between the open position and the closed position, and upon the impact being applied on the vehicle upon a rear/front crash, at least a portion of the first engaging element abuts with an inner wall surface of the second engaging element thus preventing the hook element from moving away from the slit to restrict the movement of the cover in the first direction, characterized in that, the hook element of the cover is at least partially enclosed by the first engaging element.

19. The console box as claimed in claim 18, wherein the first engaging element is the protrusion, and the second engaging element is a slot.

* * * * *